(12) United States Patent
Bonacini

(10) Patent No.: US 7,828,035 B2
(45) Date of Patent: Nov. 9, 2010

(54) MACHINE FOR FITTING AND REMOVING WHEEL TIRES FOR VEHICLES

(75) Inventor: Maurizio Bonacini, Correggio (IT)

(73) Assignee: Giuliano, S.p.A., Correggio (RE) (IT)

( * ) Notice: Subject to any disclaimer, the term of this patent is extended or adjusted under 35 U.S.C. 154(b) by 92 days.

(21) Appl. No.: 12/292,438

(22) Filed: Nov. 19, 2008

(65) Prior Publication Data

US 2009/0129901 A1    May 21, 2009

(30) Foreign Application Priority Data

Nov. 21, 2007   (IT)   .......................... MO2007A0349

(51) Int. Cl.
*B60C 25/135*   (2006.01)
(52) U.S. Cl. ........................................ 157/1.24; 157/19
(58) Field of Classification Search ................ 157/1.24, 157/19, 16, 1.17, 1.1, 1, 119
See application file for complete search history.

(56) References Cited

U.S. PATENT DOCUMENTS

| | | | | |
|---|---|---|---|---|
| 1,936,984 A | * | 11/1933 | Listebarger | ................... 157/19 |
| 2,920,664 A | * | 1/1960 | Lomen et al. | .................. 157/19 |
| 5,219,012 A | * | 6/1993 | Corghi | ......................... 157/19 |
| 7,591,295 B2 | * | 9/2009 | Bonacini | .................... 157/1.17 |
| 2007/0144681 A1 | | 6/2007 | Cunningham | |

FOREIGN PATENT DOCUMENTS

| | | |
|---|---|---|
| EP | 1253026 | 10/2002 |
| EP | 1982851 | 10/2008 |

* cited by examiner

*Primary Examiner*—Hadi Shakeri
(74) *Attorney, Agent, or Firm*—Dykema Gossett PLLC

(57) ABSTRACT

A machine for fitting and removing wheel tires for vehicles includes a bearing structure that supports a clamping and rotating device of the wheel rim for vehicles around a substantially vertical rotation axis, at least one tool supported by the bearing structure and suitable for the fitting/removal of a tire onto/from the rim, and a lifting arrangement adapted to position and remove the wheel onto/from the clamping and rotating device. The lifting arrangement includes a first framework that defines a substantially horizontal support surface for the wheel and is associated with the bearing structure and mobile between a lowered position in which it surrounds the clamping and rotating device at least partially and a raised position in which it is substantially higher than the clamping and rotating device, a second framework with a resting portion for the wheel and which is associated with and rotates along the bearing structure, and a moving device for the first and second frameworks.

22 Claims, 4 Drawing Sheets

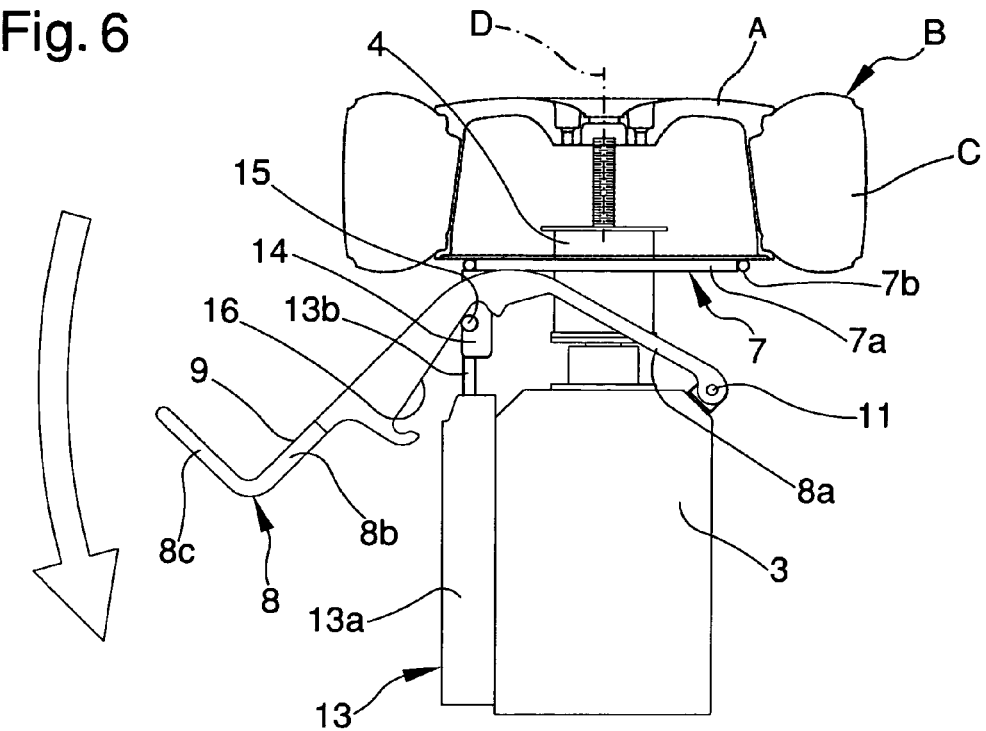
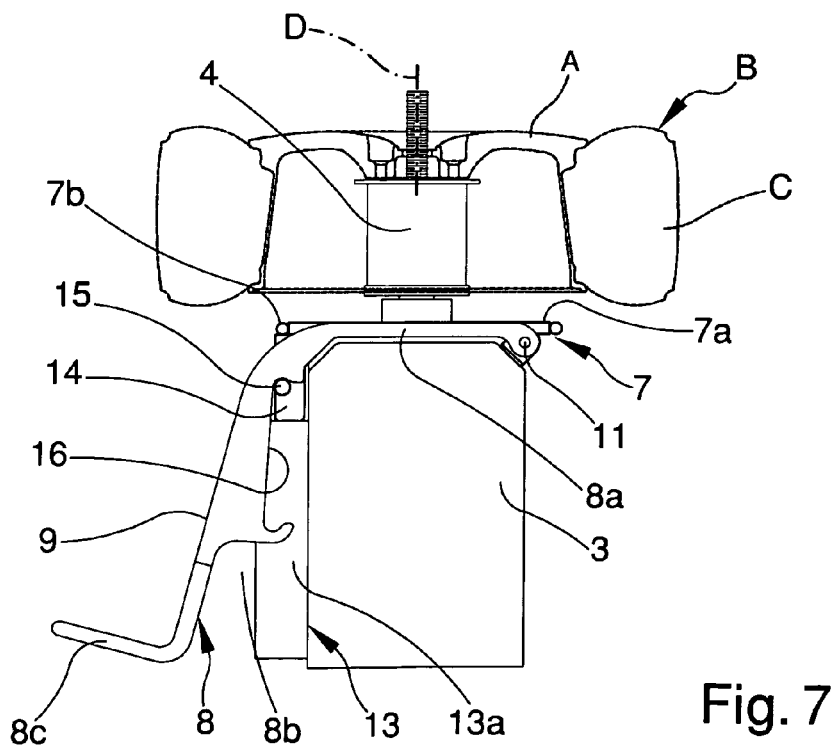

MACHINE FOR FITTING AND REMOVING WHEEL TIRES FOR VEHICLES

BACKGROUND OF THE INVENTION

1. Field of the Invention

This invention relates to a machine for fitting and removing wheel tires for vehicles and equipped in particular with an automated wheel lifting arrangement.

2. The Prior Art

It is known that wheels for vehicles comprise a metal rim fitted with annular flanges along the perimeter adapted to house, as an adherent stop, the end portions, so-called "beads", of an elastic tire.

The use is currently known of so-called "tire changing" machines for fitting and removing tires from and onto their relevant rims for carrying out maintenance, repair or replacement jobs.

Such tire changing machines comprise, generally, a framework adapted to support a clamping and rotating device for clamping and rotating the rim of a wheel onto/from which the tire must be fitted/removed and one or more tools for fitting and removing the tire.

It is known that the clamping and rotating device for clamping and rotating the rim are set at a given height off the ground in order to facilitate the access to the wheel by an operator during the tire removal/fitting operations.

Furthermore, the wheel is generally fixed to the clamping and rotating device around a substantially vertical axis.

This necessarily requires a preliminary operation to lift the wheel off the ground for positioning onto the clamping and rotating device, and later the repositioning of the wheel on the ground following the removal/fitting operation.

This lifting operation may require the tipping of the wheel for the horizontal positioning and with a vertical rotational axis on the clamping and rotating device, and later tipping to be repositioned on the ground.

The operations for lifting and positioning the wheel on the ground are generally done manually by the operator, who is consequently subjected to notable physical strain, and the operation may indeed have to be repeated many times in a day.

To prevent this problem, tire changing machines fitted with a lifting arrangement are known which tip and lift the wheel to the height of the clamping and rotating device in an automated manner (and, in the same way, reposition the wheel on the ground).

This lifting arrangement generally comprises a first horizontal framework that extends around the clamping and rotating device, and which moves along a vertical direction by means of the operation of a first actuator and which is intended to rest the wheel on it.

A second framework, fitted with protruding prongs, is hinged to one side of the first framework and can be rotated by means of the operation of a second actuator between a first lowered position, in which it is substantially vertical with the prongs arranged horizontally near the ground, and a second raised position, in which it is horizontal and coplanar to the first framework.

When using the lifting arrangement, the operator positions the wheel vertically on the second framework in the lowered position.

The first framework and the second framework hinged to it are then lifted by means of the operation of the first actuator and, following this, the second framework is moved to the raised position by means of the operation of the second actuator; in this raised position the wheel is horizontal (with a vertical rotation axis) and the first framework is positioned above the clamping and rotating device.

The operator then drags the wheel from the first framework onto the second framework, which may be fitted with idle rollers, and centres the rotation axis of the wheel with respect to the rotation axis of the clamping and rotating device below.

The first framework is then lowered by means of the first actuator to fix the wheel rim to the clamping and rotating device.

Following the tire removal/fitting operations, the rim is released from the clamping and rotating device and the combined action of the first and second framework, in the same way as described above, allows the wheel to be repositioned on the ground.

These known machines however have some difficulties.

The known lifting arrangements in fact oblige the operator to drag the wheel manually from the second framework to the first framework in order to position the wheel over the clamping and rotating device for centring and fixing. In the same way, the wheel must also be dragged by the operator manually from the first framework to the second framework to reposition the wheel on the ground.

Consequently, this also requires physical effort by the operator, and also constitutes a waste of time which greatly increases the overall wheel movement times towards/from the clamping and rotating device.

The main aim of this invention is to provide a machine for fitting and removing wheel tires for vehicles which assures faster and less tiring wheel movement operations.

A further object of this invention is to provide a machine for fitting and removing wheel tires which handles the wheel using a structurally and functionally simpler solution.

A further object of this invention is to provide a machine for fitting and removing tires which overcomes the aforementioned drawbacks of the prior art within a rational solution that is easy to use, efficient and cost-effective.

SUMMARY OF THE INVENTION

The above objects are all achieved by a machine for fitting and removing wheel tires for vehicles which includes a bearing structure that supports a clamping and rotating device of the wheel rim for vehicles around a substantially vertical rotation axis, at least one tool supported by the bearing structure and suitable for the fitting/removal of a tire onto/from the rim, and a lifting arrangement adapted to position and remove the wheel onto/from the clamping and rotating device, the lifting arrangement being provided with at least a first framework that defines a substantially horizontal support surface for the wheel, said the first framework being associated with the bearing structure and mobile between a lowered position, in which it surrounds the clamping and rotating device at least partially, and a raised position in which it is substantially higher than the clamping and rotating device, characterised by the fact that the lifting arrangement comprise at least a second framework with a resting portion for the wheel and which is associated with and rotates along the bearing structure, and a moving device for the first and second frameworks between a first configuration in which the first framework is in the lowered position and said the resting portion of the second framework is substantially lower and at right angles to said the first framework, and a second configuration in which the first framework is in the raised position and the resting portion of the second framework is substantially coplanar and overlapping the support surface defined by the first framework.

Other characteristics and advantages of this invention will be made clearer by the description of a preferred, but not exclusive, embodiment of a machine for fitting and removing wheel tires for vehicles, illustrated as an example only and therefore not limited to the annexed drawings.

BRIEF DESCRIPTION OF THE DRAWINGS

FIGS. 2 to 7 are side views of the lifting arrangement of the machine according to the invention, which schematically illustrate the different phases of the machine operations related to the lifting of the wheel and its positioning on the clamping and rotating device of the machine.

DETAILED DESCRIPTION OF THE PREFERRED EMBODIMENT

Figure 1:
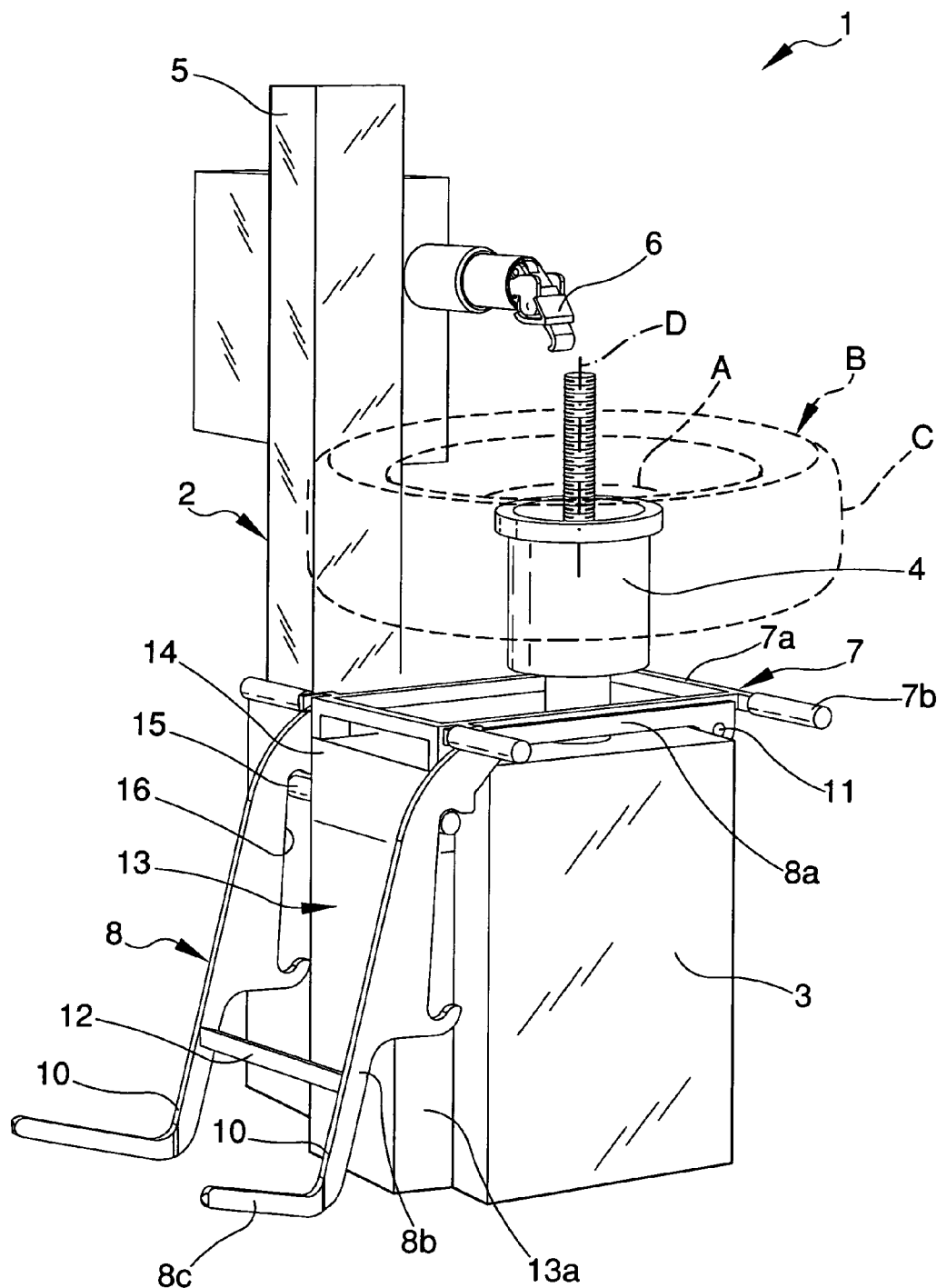
FIG. 1 is a schematic axonometric view of the machine according to the invention.

With particular reference to these figures, a machine for fitting and removing wheel tires for vehicles of the type commonly used to carry out the maintenance, repair or replacement of a wheel tire in a car repair or similar workshop is generally labelled 1.

The machine 1 comprises a bearing structure 2 which extends substantially vertically and which has a support base 3 of the clamping and rotating device 4 of the rim A of a wheel B for vehicles, and a support upright 5 for at least one tool 6 for the fitting/removal of a tire C onto/from the rim A.

In particular, the clamping and rotating device 4 are of the type commonly used in machines of the known type and are suitable for the fixing and rotation of the wheel B around a vertical rotation axis D.

The machine 1 comprises an automated lifting arrangement used to lift the wheel B off the ground and position it on the clamping and rotating device 4, and adapted to remove the wheel B from the clamping and rotating device 4 to reposition it on the ground.

The lifting arrangement comprise a first framework, generically indicated by reference 7, which is adapted to define a horizontal support surface for the wheel B and which is associated with the bearing structure 2, in particular to the base 3, and which moves along a vertical direction between a lowered position in which it surrounds the clamping and rotating device 4, and a raised position in which it is positioned above the clamping and rotating device 4.

In particular, the first framework 7 comprises a rectangular frame 7a which defines the above mentioned support surface for the wheel B and which delimits a central opening from which, in the lowered position, the clamping and rotating device 4 extend vertically.

The first framework 7 has four idle rollers 7b which extend horizontally and parallel to each other on the sides and near the respective edges of the frame 7a and which are adapted to facilitate the movement of the wheel B during the centring operations on the rotation axis D. It is not however excluded that alternative solutions may be constructed which foresee, e.g., the use of a different number or a different arrangement of the rollers, or again, the use of other sliding devices.

The lifting arrangement 7 also comprise a second framework 8 associated with and rotating on the bearing structure 2 and adapted to lift the wheel B from the ground, moving it from a substantially vertical position to a horizontal position.

The second framework 8 is also used to reposition the wheel B on the ground following the removal/fitting operations of the tire C.

The second framework 8 has a first section 8a articulated to the bearing structure 2, on a substantially lateral portion of the base 3, underneath the clamping and rotating device 4. A second section 8b of the second framework 8 extends substantially at right angles with respect to the first section 8a and defines a resting portion 9 that houses the wheel B.

The free end of the second framework 8 extends along a third section 8c which extends substantially at right angles with respect to the second section 8b and which holds the wheel B during the lifting operations or when repositioning on the ground.

In particular, the second framework 8 comprises a pair of side arms 10 that are parallel to each other and spaced apart, which are articulated at one end in their respective hinging points 11 onto the base 3, which extend to define said first, second and third portions 7a, 7b and 7c and which are joined together by the interposition of a bridge 12 at the free end.

Figures 2, 3:
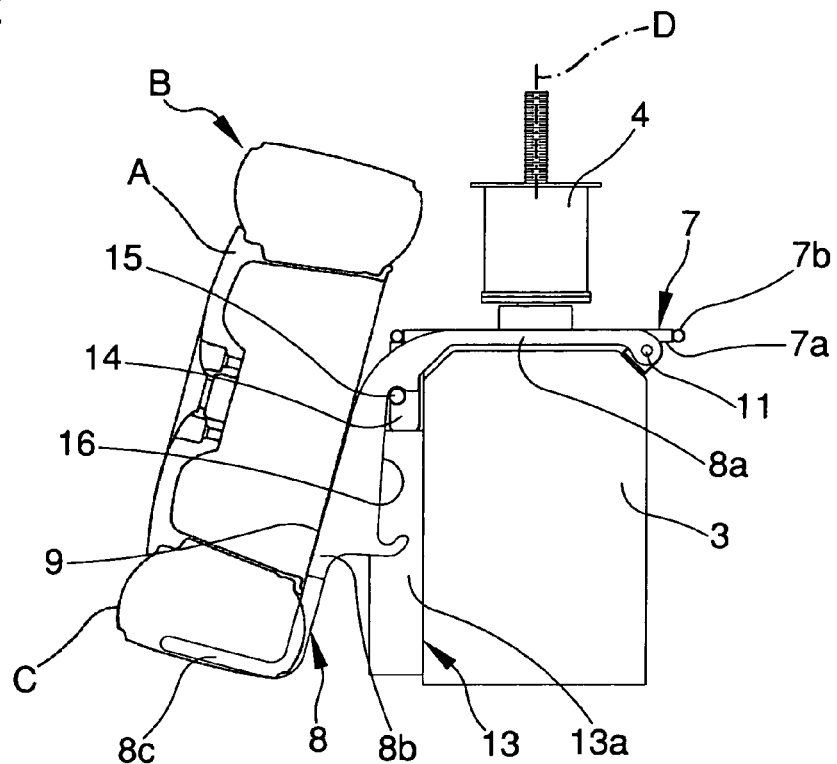
Figure 4:
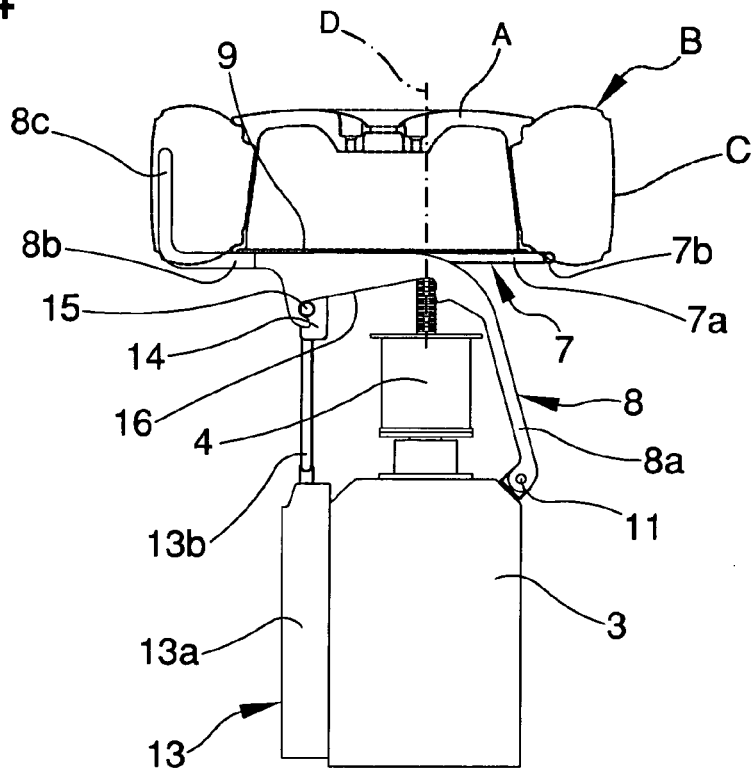
Figure 5:
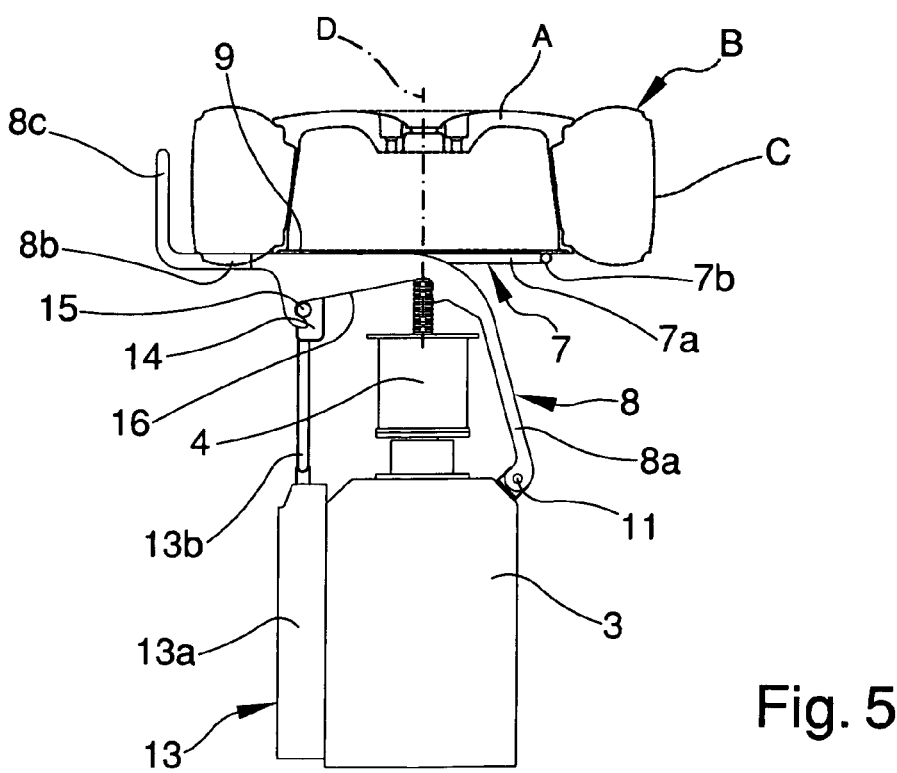

The machine 1 comprises a moving device 13 for moving the first and second frameworks 7 and 8 between a first configuration, illustrated schematically in FIGS. 2 and 7, and a second configuration, illustrated schematically in FIGS. 4 and 5.

In the first configuration the first framework 7 is in the lowered position and the resting portion 9 of the second framework 8 is arranged substantially at right angles with respect to the first framework 7 and lower than it.

In particular, in the first configuration the first section 8a of the second framework 8 is arranged substantially horizontally and partly surrounds the clamping and rotating device 4, the second section 8b extends substantially vertically and downwards along a side portion of the base 3, and the third section 8c extends substantially horizontally near the ground.

In the second configuration the first framework 7 is in the raised position and the resting portion 9 of the second framework 8 is substantially coplanar and overlapping the support surface defined by the first framework 7.

In particular, in the second configuration, the first section 8a of the second framework 8 extends substantially vertically and upwards and the second section 8b is arranged horizontally, above the clamping and rotating device and extends externally along the two sides of the frame 7a of the first framework 7.

The moving device 13 are composed of a single actuator device that moves both the first framework 7 and the second framework 8.

The actuator device 13 has a fixed portion 13a integrally associated with the base 3 of the bearing structure 2 and a mobile portion 13b associated with the first framework 7 and the second framework 8.

In particular, the actuator device 13 is composed of a linear actuator, of the type of a hydraulic, electromechanical or pneumatic cylinder; the fixed portion 13a is composed of the body of the linear actuator 13 and is fixed to the base 3, while the mobile portion 13b is composed of the stem of the linear actuator 13 and extends vertically upwards.

With particular but not exclusive reference to the particular embodiment illustrated in said figures, the mobile portion 13b of the linear actuator 13 has a small frame 14 with which one of the sides of the frame 7a of the first framework 7 is integrally associated, said mobile portion 13b being adapted to vertically translate for the movement of the first framework 7 between the lowered position and the raised position.

The small frame 14 also has a pusher element 15 of the second framework 8 which allows for its movement, at the same time as the first framework 7, between said first and second configurations.

In particular, this pusher element 15 is composed of a rod, supported horizontally by the small framework 14, the protruding ends of which fit and slide along a section of the second framework 8.

The second framework 8 comprises guide elements 16 for guiding the sliding of the rod 15, composed of a pair of open straight slots, defined along the second section 8b and on the respective side arms 10, inside which the respective protruding ends of the rod 15 fit and slide.

In particular, the slots 16 extend parallel to each other along appropriately inclined directions with respect to the surface defined by the resting portion 9, in order to assure correct positioning in both the first and second configuration.

However, alternative conformations of the slots 16, to allow predefined variations in the rotation speed of the second framework 8 during lifting or repositioning of the wheel B on the ground, are not excluded.

In the use of the machine 1, the first and second frameworks 7 and 8 are initially positioned in the first configuration.

A wheel B, on which maintenance, repair or replacement operations of the tire C are to be carried out, is positioned by an operator on the second framework 8, arranged substantially vertically and resting on the second and third sections 8b and 8c (FIG. 2).

The first and second frameworks are then lifted by means of the operation of the linear actuator 13 (FIG. 3) to reach the second configuration, in which the wheel is arranged horizontally above the clamping and rotating device 4 and the first and second frameworks 7 and 8 are substantially coplanar and overlapping (FIG. 4).

When moving from the first to the second configuration the small frame 14 associated with the stem 13b of the linear actuator 13 is raised, moving the first framework 7 from the lowered position to the raised position and pushing the second framework 8 in rotation upwards by means of the ends of the rod 15 which fit and slide in the slots 16.

The operator then centres the rotation axis of the wheel B with the rotation axis D of the clamping and rotating device 4, during which time the wheel B moves on the rollers 7b of the first framework 7 (FIG. 5).

It should be noted that during the centring operation the wheel B movement is minimal, as due to the particular arrangement and conformation of the first and second frameworks 7 and 8, the rotation axis of the wheel B is in any case near the rotation axis D.

Afterwards, the first and second frameworks 7 and 8 are returned to the first configuration by the linear actuator 13 and, in particular, the movement of the first framework 7 from the raised position to the lowered position brings the wheel B, in particular the rim A, onto the clamping and rotating device 4 (FIGS. 6 and 7).

The operator then fixes the wheel B to the clamping and rotating device 4 and proceeds with the following fitting/removal operations of the tire C.

As can easily be deduced from the above-described lifting and positioning phase of the wheel on the clamping and rotating device 4, following the fitting/removal operations of the tire C, the combined action of the first and second frameworks 7 and 8 and the positioning of these firstly in the second configuration, then again in the first configuration, allow the wheel B to be repositioned on the ground.

It has in practice been seen how this invention achieves the proposed objects, and in particular the fact is underlined that the described machine assures a faster and less strenuous movement of the wheel.

More specifically, the particular substantially overlapping position between the first and second frameworks in the second configuration, during lifting, brings the rotation axis of the wheel near to the rotation axis of the clamping and rotating device, avoiding manual movements of the wheel which are time consuming and tiring for the operator.

After lifting the wheel using the second framework, the distance between the rotation axis of the wheel and the rotation axis of the clamping and rotating device reduces as the size of the wheel being handled increases. This therefore leads to less movements of the wheel during the centring phase for larger sized wheels.

In the same way, the invention described leads to faster and less tiring operations to reposition the wheel on the ground.

Furthermore, the presence of a single linear actuator to move both the first and second frameworks allows the movement of the wheel using a structurally and functionally simpler solution.

The invention thus conceived is susceptible to numerous modifications and variations, all of which falling within the scope of the inventive concept.

Furthermore all the details can be replaced with others that are technically equivalent.

In practice, the materials used, as well as the contingent shapes and dimensions, may be any according to requirements without because of this moving outside the protection scope of the following claims.

The invention claimed is:

1. A machine for fitting and removing wheel tires for vehicles, comprising:
    a bearing structure having a support base that supports a clamping and rotating device of a wheel rim for vehicles around a substantially vertical rotation axis,
    at least one tool supported by said bearing structure and suitable for the fitting/removal of a tire onto/from said rim, and
    a lifting arrangement adapted to position and remove said wheel onto/from said clamping and rotating device, said lifting arrangement being provided with
        at least a first framework that defines a substantially horizontal support surface for said wheel, said first framework being associated with said bearing structure and mobile between a lowered position in which it surrounds said clamping and rotating device at least partially, and a raised position in which it is substantially higher than said clamping and rotating device,
        wherein said lifting arrangement comprise at least a second framework with a resting portion for said wheel and which is associated with and rotates along said bearing structure, and
        a moving device for moving said first and second frameworks between a first configuration in which said first framework is in the lowered position and said resting portion of the second framework is substantially lower and at right angles to said first framework, and a second configuration in which said first framework is in the raised position and said resting portion of the second framework is substantially coplanar and overlapping the support surface defined by said first framework.

2. The machine according to claim 1, wherein said moving device comprise at least an actuator device which has a fixed portion integrally associated with said bearing structure and a mobile portion associated with said first framework and said second framework.

3. The machine according to claim 2, wherein said mobile portion of the actuator device is integrally associated with said first framework and is adapted to translate along a substantially vertical direction for the movement of said first framework between said lowered position and said raised position.

4. The machine according to claim 2, wherein said mobile portion of the actuator device comprises at least a pusher element of said second framework.

5. The machine according to claim 4, wherein said pusher element is associated sliding along at least a section of said second framework.

6. The machine according to claim 4, wherein said second framework comprises at least a guide element for guiding said pusher element.

7. The machine according to claim 6, wherein said guide element comprise at least a slot inside which at least a corresponding section of said pusher element engages sliding.

8. The machine according to claim 7, wherein said slot extends along a substantially inclined direction with respect to the surface defined by said resting portion of the second framework.

9. The machine according to claim 7, wherein said slot is of the type of an open slot.

10. The machine according to claim 7, wherein said pusher element comprises at least a substantially horizontal rod.

11. The machine according to claim 10, wherein said guide element comprise at least a pair of said slots, spaced apart from each other, inside which the respective sections of said rod fit and slide.

12. The machine according to claim 2, wherein said actuator device is of the type of a linear actuator.

13. The machine according to claim 1, wherein said moving device comprise only one actuator device.

14. The machine according to claim 1, wherein said bearing structure has a support base that supports said clamping and rotating device and wherein said second framework comprises a first section articulated to said support base and a second section which extends substantially at right angles from said first section and which defines said resting portion.

15. The machine according to claim 14, wherein a free end of said second framework has at least a holding third section for holding said wheel which extends substantially at right angles to said second section.

16. The machine according to claim 14, wherein said first section of the second framework is hinged at a substantially lateral portion of said support base, underneath said clamping and rotating device.

17. The machine according to claim 14, wherein in said first configuration, said first section of the second framework is arranged substantially horizontally and surrounds at least partially said clamping and rotating device, and said second section of the second framework extends substantially vertically and downwards near a side portion of said support base.

18. The machine according to claim 14, wherein in said second configuration, said first section of the second framework extends substantially vertically and upwards and said second section of the second framework is arranged substantially horizontally above said clamping and rotating device.

19. The machine according to claim 14, wherein said second framework comprises at least a guide element for guiding said pusher element, and said guide element are defined along said second section of the second framework.

20. The machine according to claim 1, wherein said first framework comprises at least a substantially rectangular frame.

21. The machine according to claim 1, wherein said first framework comprises facilitating elements for facilitating the movement of said wheel on said support surface.

22. The machine according to claim 21, wherein said facilitating elements for facilitating the movement are of the roller type or the like and/or other sliding devices.

* * * * *